(12) United States Patent
Perkins et al.

(10) Patent No.: US 9,038,042 B2
(45) Date of Patent: May 19, 2015

(54) STAGED LOOP INSTRUCTIONS

(75) Inventors: Michael G. Perkins, Edinburgh (GB); Andrew J. Higham, Edinburgh (GB)

(73) Assignee: ANALOG DEVICES, INC., Norwood, MA (US)

( * ) Notice: Subject to any disclaimer, the term of this patent is extended or adjusted under 35 U.S.C. 154(b) by 308 days.

(21) Appl. No.: 13/537,731

(22) Filed: Jun. 29, 2012

(65) Prior Publication Data

US 2014/0007061 A1    Jan. 2, 2014

(51) Int. Cl.
*G06F 9/45*         (2006.01)
*G06F 9/38*         (2006.01)

(52) U.S. Cl.
CPC ............... *G06F 9/381* (2013.01); *G06F 8/452* (2013.01); *G06F 8/443* (2013.01); *G06F 8/4452* (2013.01)

(58) Field of Classification Search
CPC ......... G06F 8/443; G06F 8/445; G06F 8/452; G06F 8/4452
See application file for complete search history.

(56) References Cited

U.S. PATENT DOCUMENTS

| | | | |
|---|---|---|---|
| 6,016,399 A * | 1/2000 | Chang ............................ | 717/150 |
| 6,289,443 B1 | 9/2001 | Scales et al. | |
| 6,567,895 B2 | 5/2003 | Scales | |
| 6,615,403 B1 * | 9/2003 | Muthukumar et al. ....... | 717/160 |
| 6,629,238 B1 | 9/2003 | Arora et al. | |
| 6,754,893 B2 | 6/2004 | Granston et al. | |
| 6,820,250 B2 | 11/2004 | Muthukumar et al. | |
| 6,912,709 B2 | 6/2005 | Helder et al. | |
| 6,954,927 B2 * | 10/2005 | Ostanevich ..................... | 717/160 |
| 7,281,117 B2 | 10/2007 | Tanaka et al. | |
| 7,302,557 B1 * | 11/2007 | Hwu et al. ...................... | 717/160 |
| 7,415,601 B2 | 8/2008 | May et al. | |
| 7,631,305 B2 * | 12/2009 | Rong et al. ..................... | 717/160 |
| 7,698,696 B2 | 4/2010 | Ogawa et al. | |
| 7,725,696 B1 * | 5/2010 | Hwu et al. ...................... | 717/150 |
| 7,747,990 B2 * | 6/2010 | Fernandes et al. ............. | 717/151 |
| 8,136,107 B2 * | 3/2012 | Zaks .............................. | 717/150 |
| 8,418,157 B2 * | 4/2013 | Ogawa et al. ................. | 717/150 |
| 2002/0133813 A1 * | 9/2002 | Ostanevich ..................... | 717/150 |
| 2002/0144092 A1 * | 10/2002 | Topham et al. ................ | 712/217 |
| 2004/0015934 A1 * | 1/2004 | Muthukumar et al. ........ | 717/160 |
| 2004/0098713 A1 * | 5/2004 | Ogawa et al. .................. | 717/150 |
| 2005/0039167 A1 * | 2/2005 | Fernandes et al. ............. | 717/121 |

(Continued)

FOREIGN PATENT DOCUMENTS

WO     WO-2010033622 A2     3/2010

OTHER PUBLICATIONS

Hiroyuki et al., "Characteristics of Loop Unrolling Effect: Software Pipelining and Memory Latency Hiding", Jan. 2001 IEEE, pp. 63-72; <http://ieeexplore.ieee.org/stamp/stamp.jsp?arnumber=955198>.*

(Continued)

*Primary Examiner* — Thuy Dao
*Assistant Examiner* — Ben C Wang
(74) *Attorney, Agent, or Firm* — Patent Capital Group

(57) ABSTRACT

Loop instructions are analyzed and assigned stage numbers based on dependencies between them and machine resources available. The loop instructions are selectively executed based on their stage numbers, thereby eliminating the need for explicit loop set-up and tear-down instructions. On a Single Instruction, Multiple Data machine, the final instance of each instruction may be executed on a subset of the processing elements or vector elements, dependent on the number of iterations of the original loop.

16 Claims, 8 Drawing Sheets

(56) References Cited

U.S. PATENT DOCUMENTS

| | | | |
|---|---|---|---|
| 2005/0097509 A1* | 5/2005 | Rong et al. | 717/106 |
| 2005/0268039 A1 | 12/2005 | Archambault et al. | |
| 2005/0283772 A1* | 12/2005 | Muthukumar et al. | 717/151 |
| 2006/0184779 A1* | 8/2006 | Pisek et al. | 712/241 |
| 2006/0255983 A1* | 11/2006 | Agarwala | 341/51 |
| 2007/0120867 A1 | 5/2007 | Shastry et al. | |
| 2008/0209407 A1 | 8/2008 | Okabayashi et al. | |
| 2008/0244549 A1* | 10/2008 | Kejariwal et al. | 717/160 |
| 2008/0267293 A1 | 10/2008 | Swami et al. | |
| 2008/0267513 A1* | 10/2008 | Sankaran | 382/232 |
| 2009/0327674 A1* | 12/2009 | Codrescu et al. | 712/241 |
| 2010/0175056 A1* | 7/2010 | Ogawa et al. | 717/151 |
| 2013/0232476 A1* | 9/2013 | Varma et al. | 717/150 |
| 2013/0339682 A1* | 12/2013 | Uliel et al. | 712/226 |
| 2014/0298306 A1* | 10/2014 | Rong et al. | 717/153 |

OTHER PUBLICATIONS

Dragomir et al., "Loop Unrolling and Shifting for Reconfigurable Architectures", Sep. 2008 IEEE, pp. 167-172; <http://ieeexplore.ieee.org/stamp/stamp.jsp?tp=&arnumber=4629926>.*

Touati et al., "Early Control of Register Pressure for Software Pipelined Loop", Oct. 2011 HAL, pp. 1-16; <https://hal.inria.fr/inria-00637264>.*

Bachir et al., "Post-Pass Periodic Register Allocation to Minimise Loop Unrolling Degree", 2008 ACM, LCTES'08, Jun. 12-13, 2008, Tucson, Arizona, USA, pp. 141-149; <http://dl.acm.org/results.cfm?h=1&cfid=615012636&cftoken=15389382>.*

* cited by examiner

STAGED LOOP INSTRUCTIONS

TECHNICAL FIELD

Embodiments of the current invention generally relate to efficient use of hardware parallelism and, in particular, to loop unrolling and software pipelining.

BACKGROUND

Compilers take computer source code written in a high-level, generic language (such as C, C++, or Java) and translate it into a low-level, machine-specific object code. Compiling code for a simple, single-core processor may consist of a relatively straightforward, one-for-one translation of high-level instructions into low-level instructions. For example, accessing data in a C++ class may be compiled into address arithmetic and memory accesses machine-level instructions.

Compiling code for a processor having multiple functional units or support for vector processing, however, may be much more complicated. A typical goal is to run the compiled program as quickly as possible by keeping each core (and/or each processor, execution unit, and pipeline, in accordance with the specific hardware of a given device) as busy as possible. This goal, however, requires that instructions originally written in series/sequence be compiled to run in parallel, and not all instructions are capable of being executed concurrently. If an input for a second instruction depends upon the result of a first instruction, for example, the first and second instructions cannot run in parallel; the second instruction must wait for the first to complete.

A "smart" compiler recognizes instructions capable of being run in parallel and creates machine code tailored to do so (either explicitly, such as code produced for a very-long-instruction-word ("VLIW") processor, or implicitly, such as code produced for a superscalar processor). Two broad categories of parallelizable situation include (i) instructions exhibiting instruction-level parallelism and (ii) instructions exhibiting data-level parallelism. Instruction-level parallelism refers to two or more instructions that have no dependencies on each other's output and may thus be computed in parallel. Data-level parallelism refers to performing operations on sets (i.e., vectors) of data in which individual operations on members of the sets are not dependent upon the operations involving other members. In order to add two matrices together, for example, the data-level parallelism of the elements in the matrices may be exploited to run some or all of the element-addition instructions in parallel because the element-level addition operations are independent.

One way that compilers achieve instruction- and data-level parallelism is by exploiting loops (e.g., for and while loops) written in the source code. Two or more iterations of a loop may be executed in parallel (i.e., "vectorization," which takes advantage of data-level parallelism) and/or consecutive iterations of a loop may be partially overlapped (i.e., "software pipelining", which takes advantage of instruction-level parallelism). One powerful algorithm for software pipelining is known as "modulo scheduling." Regarding vectorization, a for loop (for example) may call for ten iterations; if the instructions executed in each iteration are independent of those of the other iterations, and if the compiler has access to (for example) five processing elements, the compiler may create assembly code that executes two iterations of the loop at each of the five processing elements in parallel. Regarding software pipelining, if, for example, a loop includes two instructions but the first instruction does not depend on the result of the previous iteration's second instruction, the first instruction of the next iteration of the loop may be scheduled to run in parallel with the still-executing second instruction of the current iteration of the loop.

One disadvantage of vectorization and of software pipelining is that they increase the size of the executed code. Vectorization requires code to cope with odd-sized, final iterations of loops (if, e.g., a loop requires eleven iterations and five processing elements are available, the last iteration uses only one of the processing elements). This "partially-filled" final iteration may be more than merely inefficient; many large-scale processor arrays are tuned to expect a steady stream of valid data, and individual processing elements may not be so easily turned off. Software pipelining requires set-up instructions (a "loop prolog") to prepare the hardware environment before an efficient set of core instructions (a "loop kernel") may be run, after which further overhead instructions (a "loop epilog") are needed to tear down the loop and clean up the hardware environment for further instructions. In many cases, this additional, overhead code may be larger than the loop-kernel code itself and, on processors having limited instruction-cache or buffer capacity, may diminish performance. Another disadvantage is poor handling of loops having a variable number of iterations (known as a loop's "trip count"); because the trip count cannot be known at compile time, various tests of the trip count are required at run time, thereby increasing the run time of the program (especially when the trip count turns out to be small).

Existing systems that attempt to address these drawbacks may only create further disadvantages. For example, some processors (e.g., vector processors) implement a method of selectively disabling individual processing elements in the final iteration of a loop. Disabling processing elements in the final iteration of the loop, however, does not interact well with software pipelining, which overlaps instructions from various iterations in the loop kernel. Other systems express set-up, tear-down and steady state of a loop by storing the loop instructions in a fixed-size buffer and issuing a special loop instruction, but these systems not only place a limit on the size of the loop kernel (based on the size of the fixed buffer), but also cannot deal with more-complicated loops (such as those that require register renaming). Still other systems deal with complicated loops using an intricate set of rotating hardware registers, but these registers take up valuable real estate from other portions of the processor. A need therefore exists for a way to efficiently execute loop kernels of arbitrary size and complexity.

SUMMARY

In general, various aspects of the systems and methods described herein provide a compiler and a hardware mechanism to allow set-up and tear-down of software-pipelined, vectorized loops without the need for software prologs and epilogs. Embodiments of the current invention reduce code size and, in the case of unknown trip counts, improve the performance of the resulting code. Loop code is analyzed, and each instruction is assigned a stage number reflecting an overall order of execution; specifically, each instruction may be assigned to one of a plurality of temporally ordered "stages," each of which has a "stage number" reflecting its place within the execution order. When the loop is executed, the instructions therein are selectively executed based on their stage number.

In one aspect, a method of executing a loop by a computer processor includes loading loop kernel instructions for the loop into a memory of the computer processor (wherein each loop kernel instruction has a stage number associated therewith). A stage threshold is determined during each iteration of the loop, and a loop prolog is executed by executing subsets of the loop kernel instructions based on the stage threshold and stage numbers. A loop kernel is executed by repeatedly executing the loop kernel instructions, and a loop epilog is executed by executing a second set of subsets of the loop kernel instructions based on the stage threshold and stage numbers.

The computer processor may be a scalar processor, where the loop kernel instructions include instructions having instruction-level parallelism or multi-cycle latencies and/or the loop kernel instructions are software pipelined. The stage numbers may be adjusted in accordance with each copy of an unrolled loop kernel. A final execution of a loop instruction may run on fewer processing or vector elements than on earlier iterations of the loop. The fewer processing or vector elements may be selected in accordance with a mask bits controlling each processing or vector element. A loop setup instruction that includes information relating to the stage threshold may be received; the loop setup instruction may include a total loop count, a number of processing elements to use in executing the loop instructions, a stage count, or a loop-unroll factor. Executing the loop epilog, loop kernel, and the loop prolog may include comparing the instruction stage numbers to a stage threshold in the computer processor.

In another aspect, a system for executing computer-executable loop instructions includes a sequencer for receiving a loop-setup instruction comprising loop information. One or more registers store data related to a stage threshold (the data being derived from the loop information). A processing element executes (i) a loop prolog by executing subsets of received loop kernel instructions based on the stage threshold and stage numbers associated with the loop kernel instructions, (ii) a loop kernel by repeatedly executing the loop kernel instructions, and (iii) a loop epilog by executing a second set of subsets of the loop kernel instructions based on the stage threshold and stage numbers.

The registers may include stage-mask or stage-threshold registers. At least one additional processing element may execute loop kernel instructions, or vector instructions may process multiple data elements in parallel. During a final execution of an instruction, only a subset of the processing or vector elements may execute loop kernel instructions. Mask registers may store information related to executing loop kernel instructions in the final iteration. The loop information may include a total loop count, a number of processing elements to use in executing the loop instructions, a stage count, or a loop-unroll factor. A loop-count register may store a loop count, which may be derived from a total loop count divided by a number of processing elements to use in executing the loop instructions and adjusted in accordance with a stage count and rounded in accordance with a loop-unroll factor.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
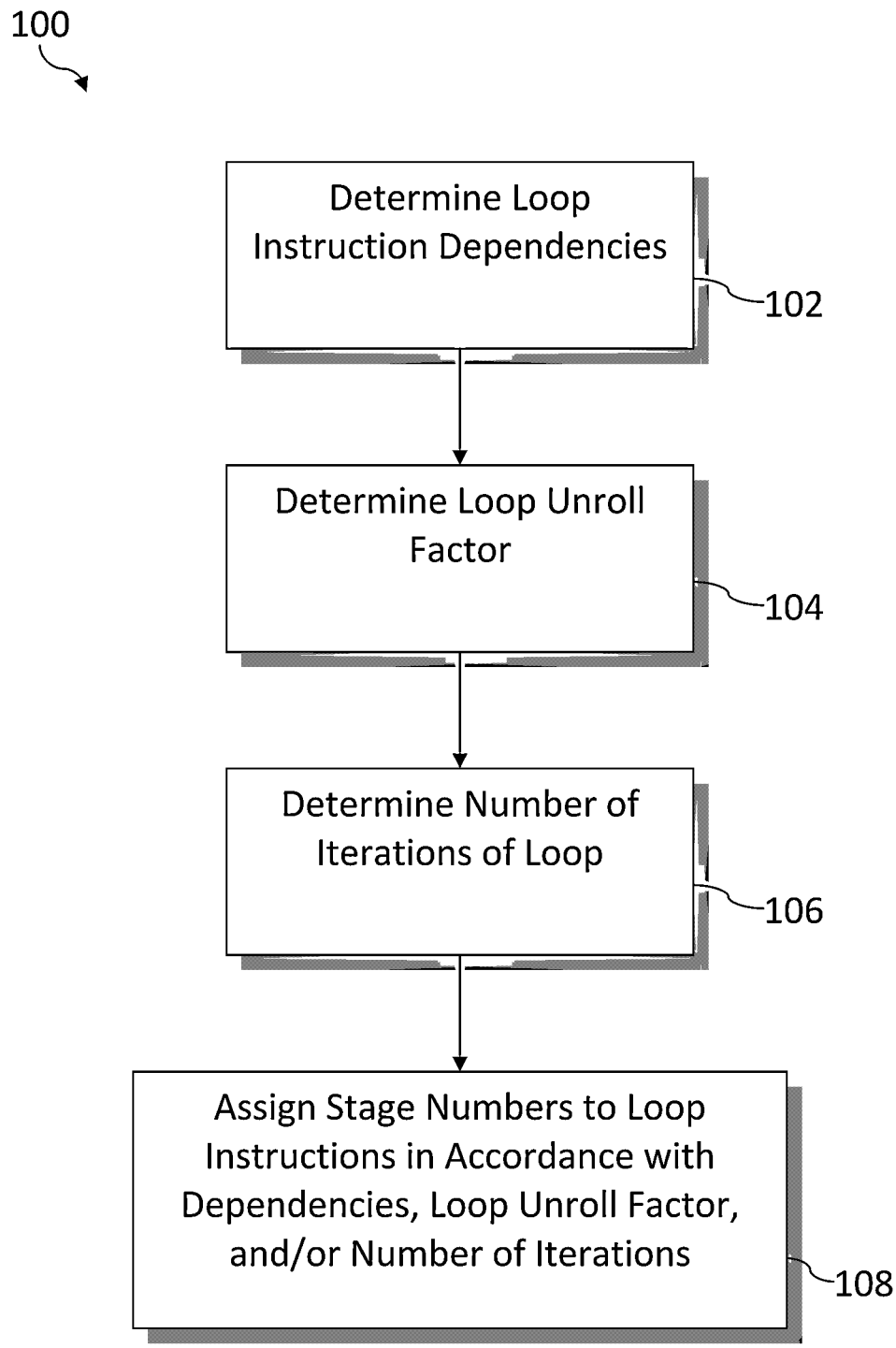
FIG. 1 is a flowchart illustrating a method for annotating loop instructions with stage information in accordance with one embodiment of the invention.

Described herein are various embodiments of methods and systems for running loops on a computer system having multiple processing elements or functional units by tagging loop-kernel instructions, or groups of loop instructions, with additional information regarding which instructions should be executed, and in what order, to set up and tear down the loop kernel in an efficient manner. When a processor receives the instructions, it analyzes the tag information and, based thereon, executes certain of the loop-kernel instructions before and after executing the loop kernel, thereby eliminating the need for explicit loop setup/tear-down instructions. For example, a compiler may tag some instructions in a loop with a [0] tag, other instructions with a [1] tag, and still other instructions with a [2] tag; very generally, and as will be explained in greater detail below, instructions within a tagged group exhibit instruction-level parallelism, and instructions in higher-numbered tagged groups may depend on the outputs of instructions in lower-numbered groups. In a first iteration of the loop, the processor may execute (in parallel) instructions tagged with [0]; in a second iteration, instructions tagged with either [0] or [1], and in third and subsequent iterations, all instructions (i.e., those tagged with either [0], [1], or [2]). In the next-to-last iteration of the loop, the processor may execute only instructions tagged with [1] or [2], and in the final iteration of the loop, only instructions tagged with [2]. As explained in greater detail below, this simple example may be expanded to more complicated loops and/or processor architectures.

For explanatory purposes, several general attributes or properties of loops will first be defined. Code for a traditional loop includes loop set-up instructions (i.e., a loop prolog), a loop kernel, and loop tear-down instructions (i.e., a loop epilog). A loop executing in accordance with one embodiment of the current invention includes one or more iterations at the beginning of its execution in which not all of the loop instructions execute, one or more iterations in which all of the loop instructions execute (i.e., the "steady-state" portion of the loop's execution), and, finally, one or more iterations at the end of the execution of the loop in which not all of the loop instructions execute. In one embodiment, the iterations at the beginning and end of the loop's execution provide the set-up and tear-down functionality for the steady-state portion of the loop, without the need for explicit extra instructions to do so.

The total number of cycles between the start of each consecutive loop iteration in the pipelined loop is known as the initiation interval, which is also the number of instruction lines within the steady-state loop kernel. When executing in this steady state, every (initiation interval) cycles a new iteration begins, while an iteration that began earlier finishes its execution. The initiation interval is shorter than the total number of cycles taken to complete an iteration of the unpipelined loop because multiple iterations of the original loop have been overlapped, allowing later iterations of the loop to begin before earlier ones have completed. For example, if the initiation interval is 2, and the total number of cycles needed to complete an iteration is 6, then iterations n, n+1, and n+2 will all be in flight at the same time.

Instructions in the loop are given a "stage number" dependent on the number of multiples of the initiation interval that have passed since the loop iteration was begun. In the above example, the first two instruction lines in the unpipelined loop belong to the first stage, instruction lines three and four belong to the second stage, while instruction lines five and six belong to the third stage. The total number of stages is known as the stage count; in this example the stage count is three. In the steady state of the loop kernel, iteration n is executing the instructions in the final stage (in this case, the third stage), iteration n+1 is executing the penultimate stage (in this case, the second stage) and so on. In our example, iteration n+2 is beginning execution by executing the instructions in the first stage.

In one embodiment of the invention, the stage number is used to tag instructions in the loop kernel. Instructions belonging to the first stage are tagged with [0], instructions belonging to the second stage are tagged with [1], and so on.

A smaller initiation interval gives a more efficient loop kernel. Factors that help to decrease the initiation interval include a greater number of functional units available on the processor, and a smaller number of data dependences between instructions. A small initiation interval also generally increases the stage count required to generate code for the loop, which in turn leads to more code expansion if explicit loop prologs and epilogs must be generated. The number of stages required to run before the loop reaches steady state is one less than the stage count (i.e., stage count−1); the number of cycles required to run before the loop reaches steady state is thus (stage count−1)×(initiation interval). In one embodiment of the present invention, the code expansion for this overhead is removed.

Unrolling a loop refers to re-writing some or all of the loop instructions as greater number of non-loop instructions. A two-instruction for loop that iterates six times, for example, may be completely unrolled by being re-written as twelve normal (non-loop) instructions. As another example, that for loop may be partially unrolled by being re-written to have more instructions per iteration, but fewer total iterations (as, e.g., a four-instruction for loop that iterates three times). If a loop originally is written to have an odd number of iterations (e.g., two-instruction for loop that iterates five times), this partial-unrolling technique may include an initial (or final) set of instructions outside of the loop (e.g., two instructions plus a four-instruction for loop that iterates twice).

Loop unrolling may be used to facilitate software pipelining when a loop contains an instruction whose result is live (i.e. needs to be kept available) for a long time. Because a new iteration begins every (initiation interval) cycles in the pipelined kernel, an instruction's result cannot normally be used more than (initiation interval) cycles after its definition, as the result would be overwritten or "clobbered" by the copy of the instruction in the subsequent iteration before this use is reached. This problem may be solved by unrolling the loop kernel. Unrolling the loop will, of course, introduce another copy of the long-lifetime instruction into the loop kernel; to avoid this instruction overwriting the long lifetime value it is given a re-named register in which to store its value (so as to avoid clobbering the result of the earlier instruction). Using one of the above-defined terms, a loop kernel may be unrolled if the initiation interval of the loop (i.e., the "length" of the loop) is shorter than the lifetime of one of the instructions in the loop (i.e., the "long-lifetime" instruction). The level of unrolling necessary is a function of how far the initiation interval is exceeded and is known as the loop-unroll factor. If no unrolling is necessary, the loop-unroll factor is one; if two copies of the loop kernel are required, the loop-unroll factor is two, and so on.

Another attribute of a loop is whether its iteration count is fixed or variable. If is fixed, a compiler may more easily schedule its execution by (for example) testing whether the iteration count is odd or even (which may affect partially unrolled loops, as discussed above) and generating code accordingly. If the iteration count is variable, however (e.g., a for loop that iterates from 1 to x, the compiler cannot tell if the iteration count will be odd or even.

Turning now to an embodiment of the current invention, FIG. 1 illustrates a method 100 for compiling code for a loop. In a first step 102, instruction dependencies (e.g., impediments to instruction-level or data-level parallelism) are determined in the loop instructions. In a second step 104, an unpipelined version of the loop is produced which obeys these dependences, together with an initiation interval, such that a new iteration may be started and overlapped with currently executing iterations every (initiation interval) cycles without exceeding the parallel resources available on the machine. In a third step 106, the loop-unroll factor for the loop is determined (based on, e.g., the initiation interval of the loop and the lifetime of the loop instructions). In a fourth step 108, the number of iterations of the loop is determined (e.g., unknown or known, and if known, odd or even). In a fifth step 110, stage numbers are assigned to the instructions in the loop based at least in part on the dependencies and parallelism available on the hardware.

In one embodiment, instructions for a given loop have dependencies therebetween, but the unroll factor for the loop is one (i.e., no unrolling is required) and the number of iterations of the loop is known. In this embodiment, a compiler tags each loop instruction with pipeline information, i.e., a stage number. The information may be in the form of a three- or four-bit binary number, but the current invention is not limited to any particular expression of the information. The stage number may be held within the instruction encoding itself or may be specified by another mechanism, such as a parallel data structure.

During execution, the running of the loop eventually reaches a steady state in which every loop instruction is executed in each iteration, but prior to reaching the steady state, only a subset of the loop instructions are executed in each iteration. Independent instructions are executed first, possibly followed by intermediate instructions that may depend on those first instructions, followed by instructions that may depend on the first and intermediate instructions, and so on until all the instructions are being executed. In the last few iterations of the loop, the instructions that began execution first cease doing so, and the later-added, dependent instructions execute until all instructions have executed their indicated number of times.

Semantically, instructions are executed by testing their stage number against a stage threshold that may vary in each iteration. In the loop set-up portion, instructions are executed if their stage number is less than or equal to the stage threshold; in the loop tear-down portion, instructions are executed if their stage number is greater than or equal to the stage threshold. The stage threshold is incremented every iteration during the loop set-up and tear-down portions; the stage threshold is initialized to its lowest value in the loop set-up portion and initialized to its next-to-lowest value in the loop tear-down portion. The stage threshold remains constant in the steady-state portion of the loop. In one embodiment, the stage threshold is incremented by an amount equal to the loop-unroll factor, as described in greater detail below. Those of skill in the art will understand that there are many ways to achieve such semantics in hardware, and the present invention is not restricted to the use of stage thresholds. Other ways to achieve the same result may be the use of mask registers, which may be shifted on beginning the next iteration of the loop kernel, or use of other state derived from the values of the loop trip count, stage count and unroll factor. The discussion of stage thresholds is used here for clarity of explanation only.

Figure 2:
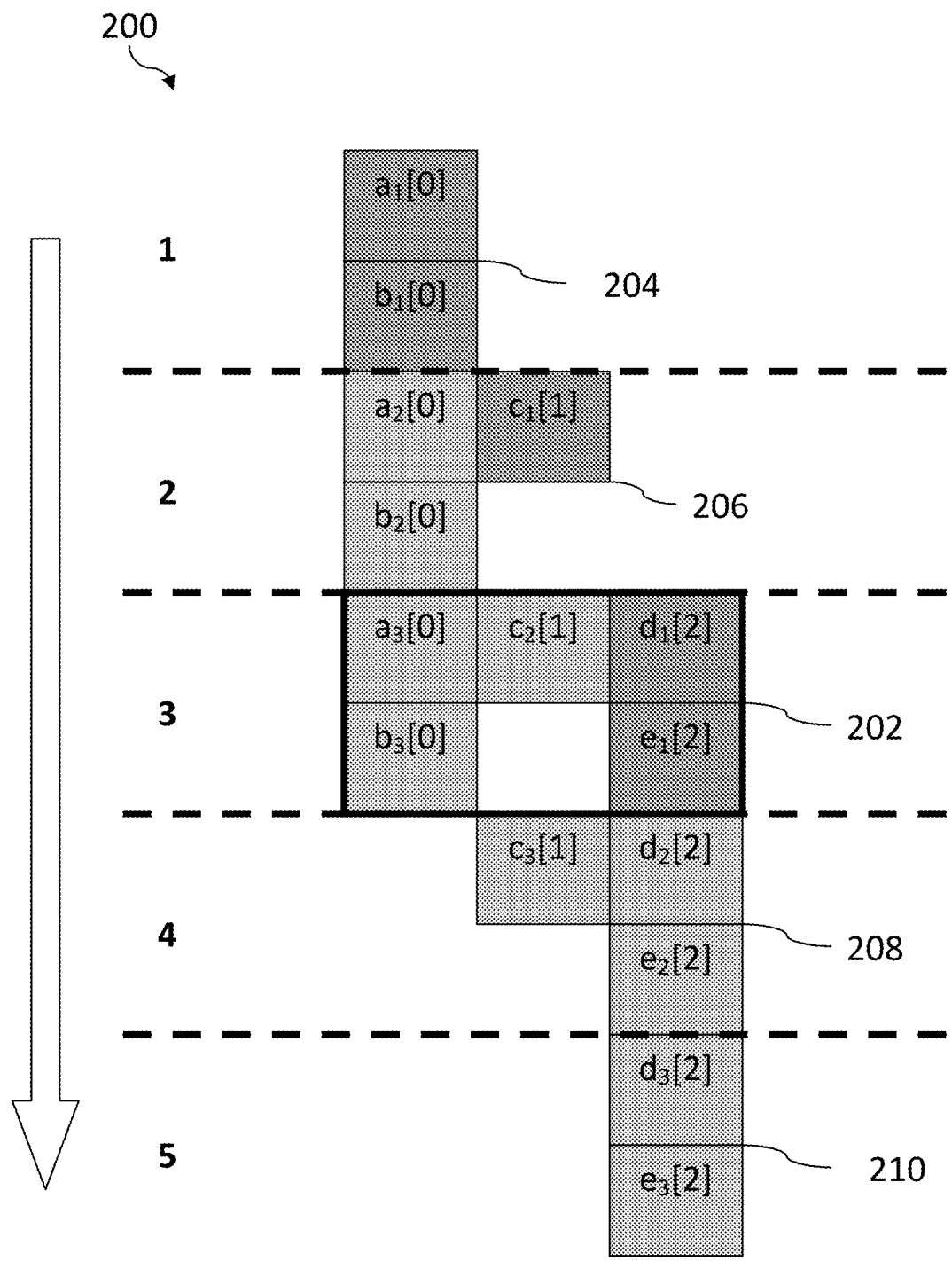
FIG. 2 is a block diagram illustrating execution of a staged loop in accordance with one embodiment of the invention.

An example 200, shown in FIG. 2, may aid in describing this embodiment of the invention. While the example 200 includes a specific set of instructions and dependencies, the present invention is not limited to only this configuration, and the example 200 is meant for illustrative purposes only. In this example, a loop executes three iterations and includes five instructions: a, b, c, d, and e. A conflict exists between instructions a and c (i.e., instruction c depends on the output of instruction a and/or the hardware prohibits their simultaneous execution). Similarly, instructions d and e cannot be run simultaneously with instructions a, b, or c due to another conflict. Based on these dependencies, the compiler assigns instructions a and b to stage [0], instruction c to stage [1], and instructions d and e to stage [2].

The initiation interval of the loop kernel may also be determined. As discussed above, the initiation interval is the number of cycles it takes to execute one iteration of the pipelined loop kernel. In this example, we assume that the hardware is capable of executing instructions a, c, and d in a first cycle and instructions b and e in a second cycle. The initiation interval is thus two because it takes two cycles to execute all of the loop instructions. For example:

```
for (i = 1; i <= 3; i++) {
    a[0]; c[1];   d[2]; // executed in a first cycle
    b[0];         e[2]; // executed in a second cycle
}
```

Using this information, the loop kernel 202 may be constructed, showing instructions a, c, and d in a first cycle and instructions b and e in a second cycle. Although only one iteration of the loop kernel 202 is shown, the loop kernel 202 may execute any number of times (in accordance with the number of iterations specified in the original code). The instructions have been annotated with their stage numbers [0], [1], and [2] and, using this information, a system may derive the loop set-up and tear-down instructions by testing the stage numbers against a stage threshold. For example, in a first iteration 204, the system executes instructions having a stage number less than or equal to a stage threshold of [0] (namely, instructions a[0] and b[0]). For illustrative purposes, the instructions have been further annotated with subscripts corresponding to the number of times they have executed (e.g., $a_1$ and $b_1$), but this information is not required by the system. In a second iteration 206, the system executes instructions having a stage number less than or equal to an incremented stage threshold of [1] (namely, instructions $a_2[0]$, $b_2[0]$, and $c_1[1]$). Note that the first execution of instruction $c_1$ in second iteration 206 occurs after the first execution of instructions $a_1$ and $b_1$ in the first iteration 204, thus satisfying the dependency/conflict between the instructions.

In this example 200, the loop enters its steady state on the third iteration 202. The stage threshold is again incremented to [2], and all instructions execute. Other loops may require fewer or more set-up iterations, depending on the nature of the loop, and the current invention is not limited to any particular number of set-up (or tear-down) iterations.

Once the loop has reached its second-to-last iteration, it exits the loop kernel 202 and enters a first tear-down iteration 208. The stage threshold is initialized to its next-lowest value (i.e., [1]) and, in the tear-down portion, only instructions having a stage number greater than or equal to the stage threshold (namely, instructions $c_3[1]$, $d_2[2]$, and $c_2[2]$) execute. In other words, in this example, instructions a and b have already executed their required number of three times, their execution halts in the first tear-down iteration 208. The stage threshold is again incremented to [2] and, in a final tear-down iteration 210, only instructions $d_3[2]$ and $e_3[2]$ execute, thus fulfilling the requirement that each instruction execute three times, while respecting the dependencies between the instructions.

In another embodiment of the current invention, with reference again to step 104 in FIG. 1, a loop requires partial unrolling. As discussed above, this requirement may occur when of the lifetime of the result of an instruction in the loop exceeds the loop's initiation interval. As described above, instructions are assigned stage numbers in accordance with their dependencies, and the instructions are scheduled in each iteration of the loop in accordance with the limitations of the hardware to run the instructions. In addition, in this embodiment, the loop kernel is unrolled (i.e., the loop instructions are duplicated in the loop kernel) as required to allow the long-lifetime instruction result to be preserved until its use. In one embodiment, in each successive duplication of the original loop-kernel instructions, (i) the stage numbers of the instructions are decremented by one and (ii) a duplicate (i.e., re-named) register is defined for the duplication(s) of the long-lifetime instructions in the loop kernel (to thereby prevent their values from clobbering each other). Finally, while in the above example (in which the loop-unroll factor was one) instructions are selected for execution by incrementing the stage threshold by one, the stage threshold is incremented by the loop-unroll factor (to reflect that more that one unrolled iteration of the loop is present in the loop kernel). Again, other ways of providing this functionality are possible in hardware, including but not restricted to the use of mask registers. The description here in terms of a stage threshold if given for clarity.

In general, the range of the stage numbers may be assigned to run from zero to a maximum value necessary (e.g., one, two, or more). When the loop-unroll factor is greater than one, however, the lower bound on the stage number range may be a negative number. In one embodiment, the lower bound is equal to (1−loop-unroll factor) and the upper bound is equal to (stage count−1). Any convenient range may be used, however, and the current invention is not limited to any particular range. For example, an all-negative range from (1−loop-unroll factor−stage count) to −1 may make design of the hardware simpler.

As before, an illustrative example 300 may aid in describing this embodiment of the invention. In this example, a loop has seven iterations and three instructions, a, b, and c: instruction b depends on the output of instruction a, and instruction c depends on the output of instruction b. The system that will run the code is capable of running all three instructions simultaneously, making the loop's initiation interval equal to one. For example:

```
for (i = 1; i <= 7; i++) {
    a; b; c;
}
```

Thus, in a straightforward case, the three instructions a, b, c might be assigned three stage numbers [0], [1], [2], respectively, and the loop may be run in a manner similar to the above example 200 shown in FIG. 2.

In this case, however, instruction b takes two cycles to complete, making its execution time greater than the initiation interval of the loop (i.e., one). The loop may therefore be unrolled to accommodate this instruction; one unroll level (loop unroll factor=two) provides a more efficient operation (e.g., one with no or fewer pipeline stalls due to the longer execution time of instruction b). Furthermore, instruction c, which depends on the output of instruction b, may be assigned a later stage number to reflect this dependency. In one embodiment, instruction a is assigned stage [0], instruction b is assigned stage [1], and instruction c is assigned stage [3] (i.e., stage [2] is empty because of the longer execution time of instruction b). The second copy of the loop kernel instructions added for the unroll have stage numbers decremented by one unit. For example:

```
for (i = 1; i <= 7; i += 2) {
    a[0]; b[1]; c[3];
    a[-1]; b[0]; c[2];
}
```

Referring again to FIG. 3, the loop kernel 302 is shown with a first portion 304 that includes the first iteration of the loop-kernel instructions a[0], b[1], and c[3] and a second portion 306 that includes the same instructions with their stage numbers decremented by one (e.g., a[-1], b[0], and c[2]). As in the above example, a system executing this loop may be passed only this information (i.e., the loop-kernel instructions and their tag information) and may derive the loop set-up and tear-down instructions based only thereon.

Thus, in a first iteration 308 of the loop, the stage threshold is set to stage number [0], and instructions in the loop kernel 302 having a stage number less than or equal to 0 are run (namely, instructions $a_1[0]$, $a_2[-1]$ and $b_1[0]$). In a second iteration 310, the stage threshold is incremented in accordance with the loop-unroll factor of two to [2] and instructions having a stage number less than or equal to [2] are run (namely, $a_3[0]$, $b_2[1]$, $a_4[0]$, $b_3[0]$ and $c_1[2]$). Thus, in the second iteration 310, instructions $a_3[0]$ and $b_2[1]$ are run in a first unrolled instance of the loop, and instructions $a_4[-1]$, $b_3[0]$ and $c_1[2]$ are run in a second unrolled instance of the loop. Because instruction b has a lifetime of two cycles, the result of instruction $b_3[0]$ is stored in a re-named register to avoid overwriting the result of the earlier-executed instruction $b_2[1]$.

As described above, once the instructions of the second iteration 310 have executed (and, in the case of instruction $b_3[0]$, are still executing), the instructions of the loop kernel 302 begin to execute. In one embodiment, the stage threshold is again incremented by two (i.e., by an amount equal to the loop-unroll factor) to [4] and, because [4] is greater than the maximum stage number, all instructions in the loop are executed. Again, although only one copy of the loop kernel 302 is illustrated, it is the steady-state portion of the loop and may execute any number of times (in accordance with the loop parameters specified in the original source code).

Once the next-to-last iteration of the loop has been reached, a first tear-down iteration 312 begins. In this iteration, the stage threshold is initialized to the next-to-lowest stage number (i.e., [0]); instructions having a stage number greater than or equal to zero (namely, $a_6[0]$, $b_6[1]$, $c_4[3]$, $b_7[0]$ and $c_5[2]$) are executed. Finally, in a final tear-down iteration 314, the instruction having a stage number greater than or equal to the again-incremented stage threshold (i.e., [2]) are executed. As with the above example, each instruction a, b, c executes seven times in accordance with the original loop iteration count, and each dependency is honored (e.g., each instance of instruction b executes one clock cycle after the execution of the corresponding instruction a; likewise the instructions c execute two cycles after the instructions b).

In another embodiment of the present invention, with reference to step 108 of FIG. 1, the number of iterations of a loop may not be known at compile time. In cases in which the loop-unroll factor is one, such as in the example 200 shown in FIG. 2, the uncertainty in the iteration count may not present a challenge; the steady-state portion of the loop simply repeats the requisite number of times, in accordance with the runtime iteration count. In cases in which the loop-unroll factor is greater than one, however, it may be more difficult to create the requisite number of iterations. Because the partially unrolled loop in the loop kernel has two or more iterations built in, total loop iteration counts that are not multiples of those two or more unrolled iterations may be difficult to construct.

Figure 3:
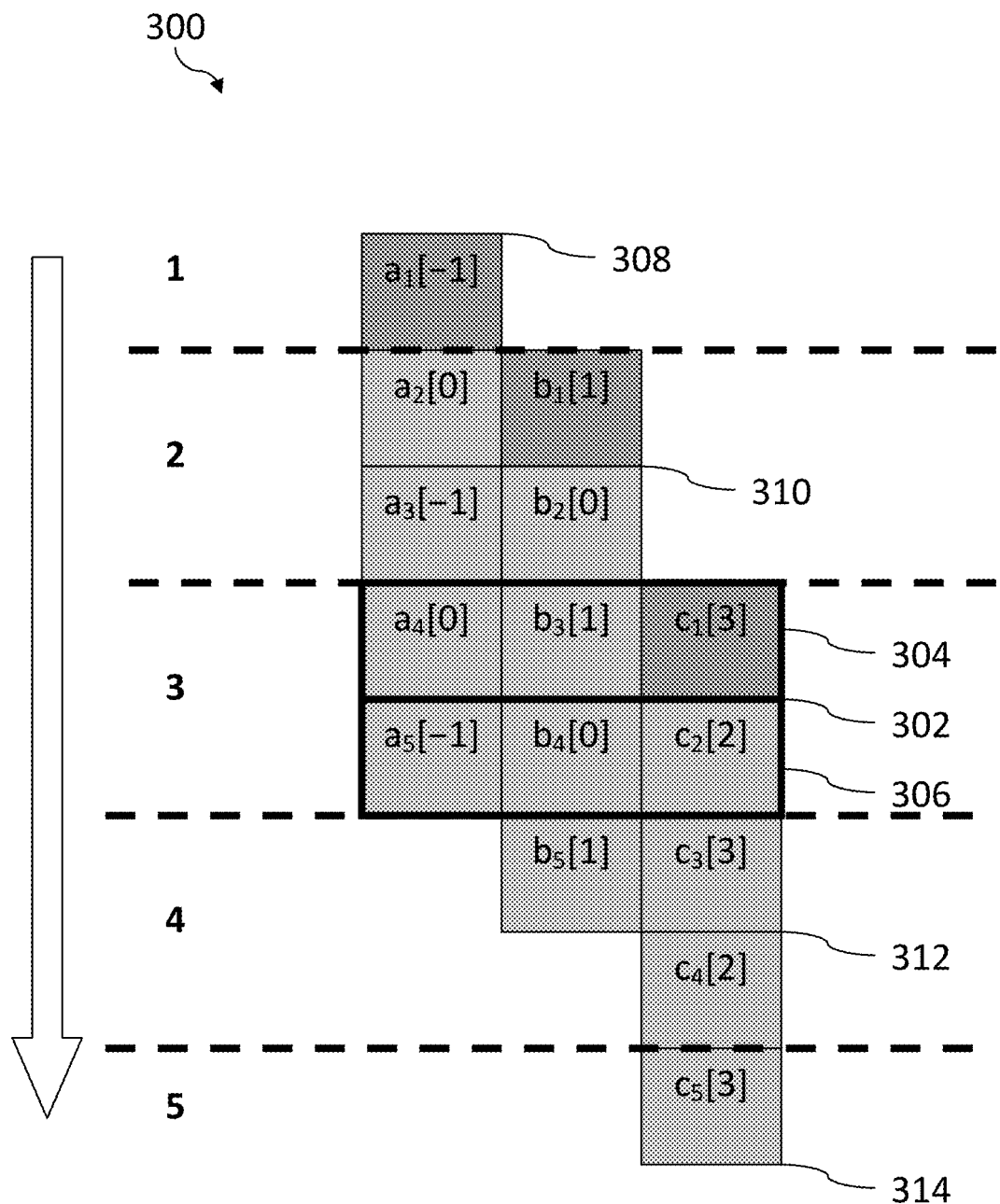
FIG. 3 is a block diagram illustrating execution of a partially unrolled staged loop in accordance with one embodiment of the invention.

As an example, the loop 300 shown in FIG. 3 has a partially unrolled kernel 302 (having a loop unroll factor of two). In that simple example, the kernel 302 executes just one time, and the total number of iterations of the loop is seven (i.e., each instruction executes seven times). If the total number of iterations were nine, eleven, or thirteen, etc., the loop kernel 302 might be repeated two, three, or four, etc. times to create the necessary number of total iterations. If, however, the total number of desired iterations is eight, the loop structure of FIG. 3 is not able to create that number without modification (i.e., one iteration of the loop 302 is too few but two iterations is too many).

In one embodiment, the instructions making up the first iteration of the loop set-up are delayed by one or more initiation intervals, as necessary, to create a desired total iteration count. The number of iterations called for by the original loop in the source code is N; the number of iterations of a loop constructed in accordance with embodiments of the current invention may be (N+[stage count−1]), in which the (stage count−1) additional iterations are used for loop set-up and tear-down iterations. If (N+[stage count−1]) is not an integer multiple of the loop-unroll factor, it is rounded up until it is (i.e., the loop is set up to run at least one more iteration). In this event, the initial value of the stage threshold is reduced below zero so that on entry to the pipelined loop, initial parts of the unrolled loop are turned off.

Figure 4:
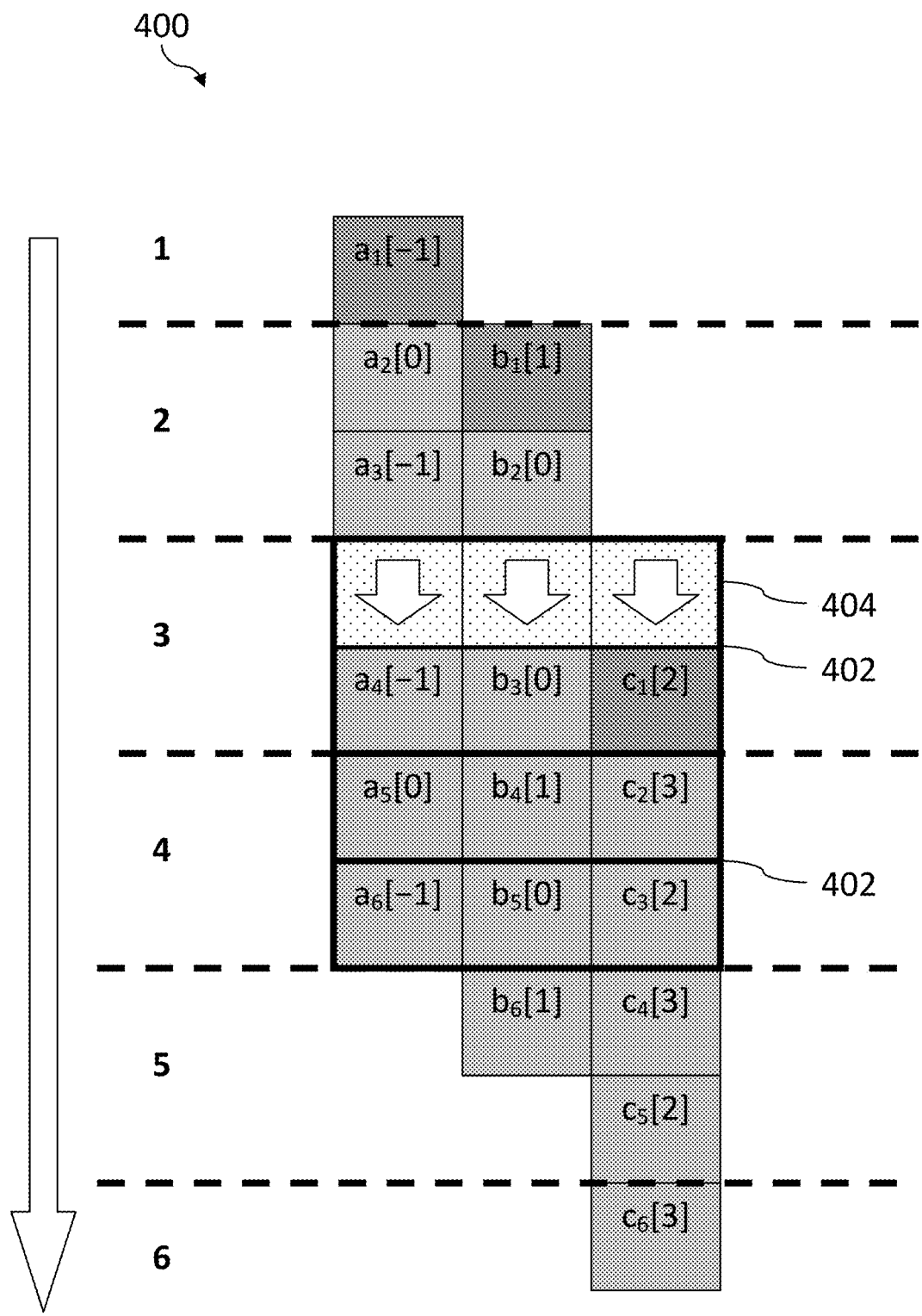
FIG. 4 is a block diagram illustrating execution of a partially unrolled staged loop requiring a delayed start in accordance with one embodiment of the invention.

Once again, an example is helpful. The loop 300 of FIG. 3, which was configured to run seven total iterations, has been modified to run eight iterations, as shown by the diagram 400 in FIG. 4. The loop kernel 402 has been duplicated to execute twice, which would have normally produced nine total iterations of the loop. However, in this case the initial value of the stage threshold is set to [−1]. The first cycle 404 of the loop prolog is therefore disabled as all instructions on this line have stage number greater than the initial stage threshold. As a result, each of the instructions a, b, c execute eight times (instead of nine).

Another benefit of the delaying indicated at 404 involves the register renaming necessary in loop unrolling. On exit from a pipelined loop, any values computed during the loop and used outside it have to be stored in a known register so that it is possible to find the correct value. However the act of register renaming of results with long lifetime during loop unrolling creates more than one register in which the value lives during the loop. If a loop kernel 402 can exit halfway through its execution (or, in the case of loops having loop-unroll factors greater than two, at some point other than fully through its execution), the final value of a result that is used outside the loop may be held in any of these renamed registers; i.e. if the loop trip count is unknown at compile time then it is not known which register will hold the final result). By placing the delay 404 at the beginning of the loop prolog 404, the kernel 402 exits after a full completion of its execution, thus making sure that it is always known which register will hold the final value of a result in the loop. Coming into the kernel 402, it is easy to ensure that all copies of a renamed register are initialized to their correct initial values if required.

Figure 5:
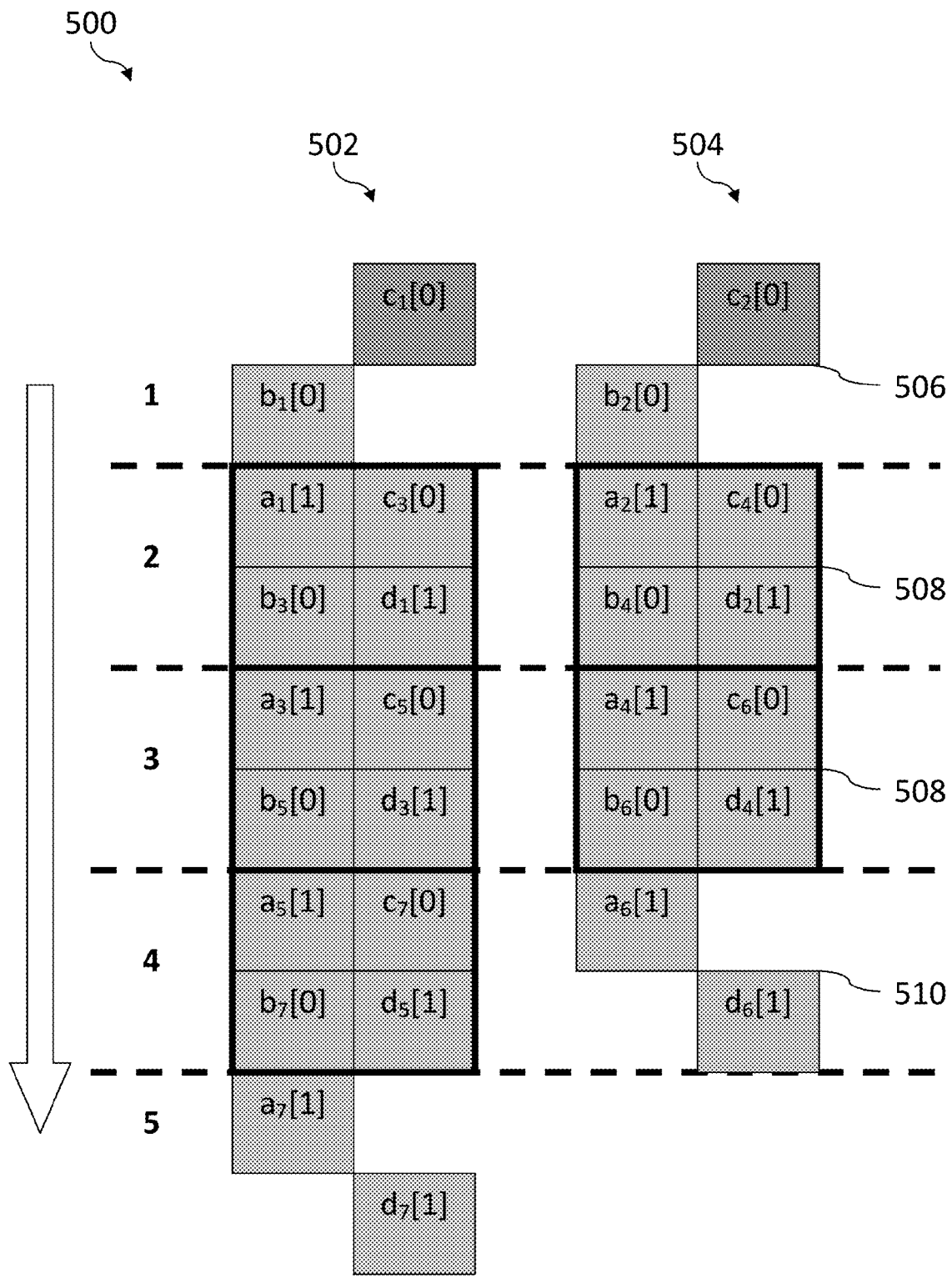
FIG. 5 is a block diagram illustrating execution of a staged loop running on multiple processing elements in accordance with one embodiment of the invention.

In one embodiment, more than one processing element is available for execution of code, and the compiler sends data-independent instructions to each processing element. If the number of iterations of a loop is not a multiple of the number of processing elements, some of the processing units may be idle in the last iteration of the loop (i.e., their operations may be masked off). An example embodiment 500 of a seven-iteration loop executing on a two-processing-element system is illustrated in FIG. 5. The code may exhibit the following dependencies:

```
for (i = 1; i <= 7; i++) {
    a[1]; c[0];
    b[0]; d[1];
}
```

Because seven is not an even multiple of two, four iterations of the loop are sent to a first processing element 502 and three iterations are sent to a second processing element 504. The stage [0] instructions begin executing in a first stage 506, in accordance with the stage threshold, and the loop kernels 508 execute in subsequent stages. The kernel 508 exits first on the second processor 504, while it runs an additional iteration on the first processor 502. Both processors 502, 504 execute stage [1] instructions in a final iteration 510.

Figure 6:
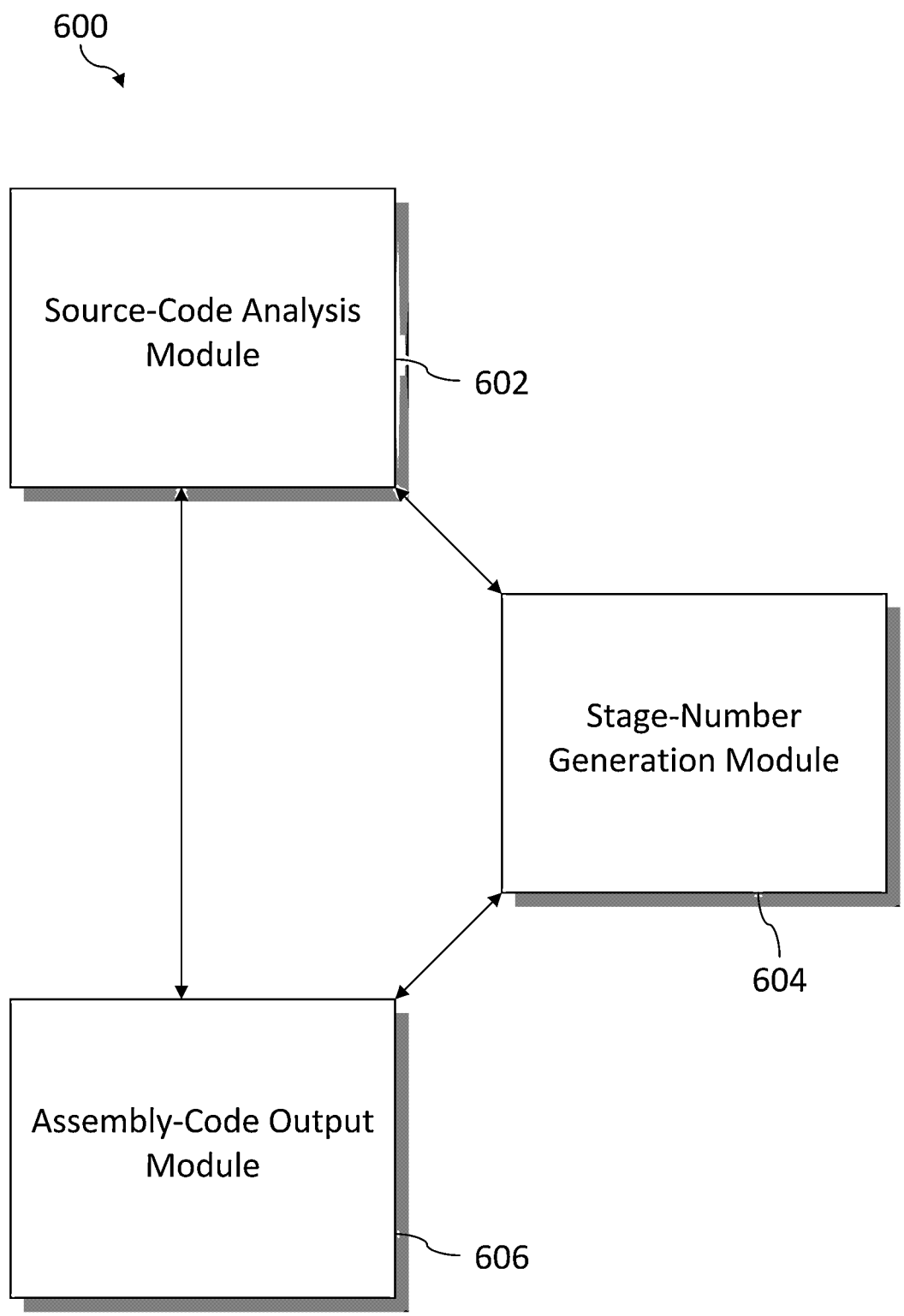
FIG. 6 is a block diagram of a system for annotating loop instructions with stages in accordance with one embodiment of the invention.

One embodiment of a system 600 for annotating loop instructions with stage numbers appears in FIG. 6. A source-code analysis module 602 analyzes source code for candidate instructions (e.g., loop instructions) that exhibit instruction-level or data-level parallelism. (Modules are typically realized in software form, i.e., as sets of computer-executable instructions stored in non-volatile memory for execution by a processor. Program modules include routines, programs, objects, components, and/or data structures, etc., that perform particular tasks or implement particular abstract data types. As is well-known in the art, however, functional modules may also be implemented in hardware or as mixed software/hardware components, depending on the requirements of a particular application.) The source-code analysis module 602 may identify these instructions in the source code based on pattern-matching, parsing, partial (or entire) compilation, or any other method of analyzing code known in the art. Any kind of source code is within the scope of the current invention. Once identified, a stage-number generation module 604 assigns stage numbers to the instructions, in accordance with embodiments of the current invention, based on inter-instruction dependencies, limitations, or features of the hardware that will run the code, or any other relevant factors. One or both of the modules 602, 604 may determine properties related to the loop, such as its initiation interval, stage count, and/or loop-unroll factor, and any or all of these properties may be used in assigning the stage numbers to the instructions. Once the stage numbers have been determined for some or all of the instructions, an assembly-code or object code output module 606 may prepare, format, and output assembly or object code (that includes the stage numbers) suitable for execution on one or more target processors. The current invention is not limited, however, to an implementation involving only these modules 602, 604, 606, and one of skill in the art will understand that the functionality implemented in the modules 602, 604, 606 may be implemented in more or fewer modules.

Figure 7:
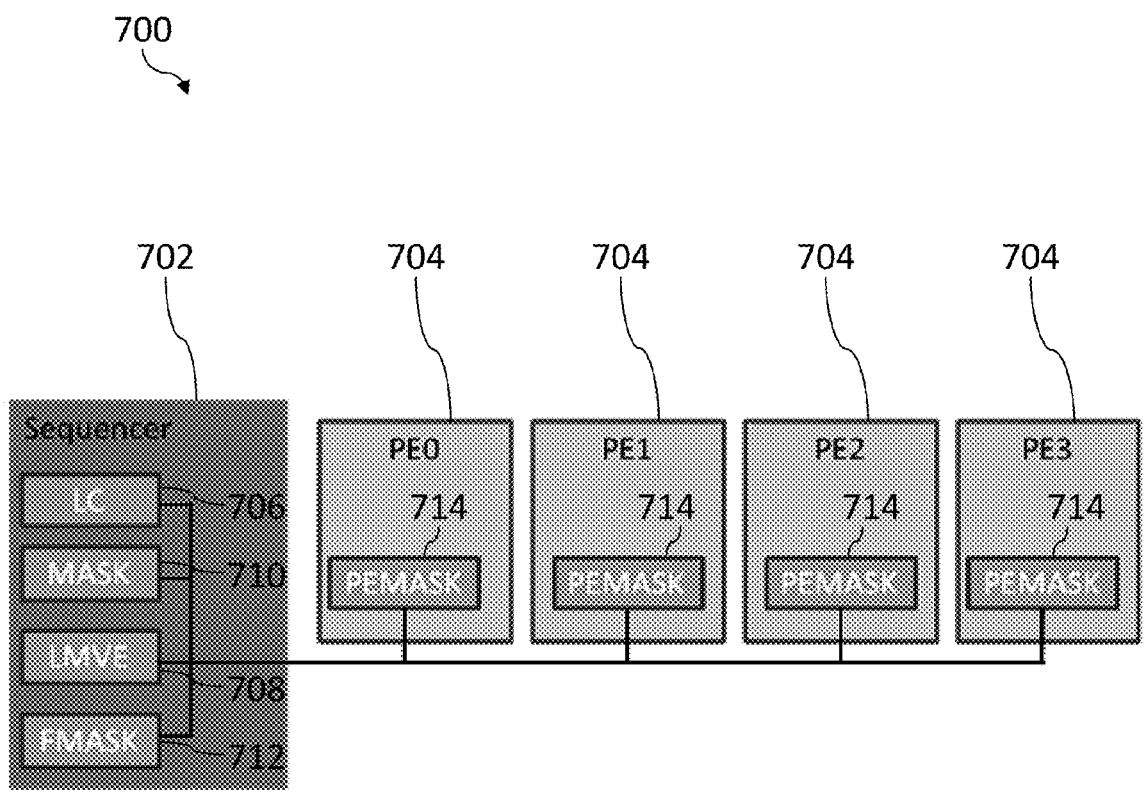
FIG. 7 is a block diagram of a system for executing staged loop instructions in accordance with one embodiment of the invention.

A system 700 for executing code having stage-number annotations appears in FIG. 7. A sequencer 702 contains state information and issues instructions to one or a plurality of processing elements 704. The sequencer 702 may store information regarding a currently-executing loop, such as the loop-unroll factor, the number of iterations remaining in the loop (i.e., the "loop count"), which stage numbers should be executed in each iteration of the loop, and which of the plurality of processing elements 704 should execute instructions in a last iteration of a loop. One of skill in the art will realize that there are many ways to implement the sequencer 702 (or its similar functionality into another functional block), and the current invention is not limited to any particular implementation. Moreover, the processing elements 704 may be any type of general purpose or specialized compute block that is controlled by the sequencer. Moreover it is to be understood that the invention also applies to the control of independent elements within vectors processed within a single compute unit, which in this sense can be treated as if they existed in separate processing elements. Such a machine is typically referred to as a Single Instruction, Multiple Data (SIMD) processor.

The sequencer 702 (more specifically, the hardware implementing it) includes registers for storing state information, such as a loop-count register 706 for storing the loop count and a loop-unroll-factor register 708 for storing the loop-unroll count (also known as a modulo-variable expansion, or "MVE," unroll factor). A stage-mask register 710 is populated with information regarding which instructions should be executed in which iteration (based on their stage numbers); for example, one bit of the stage-mask register 710 may indicate that instructions of stage [0] should execute, another bit may indicate that instructions of stage [1] should execute, and so on. The stage-mask register may be reproduced at each processing element 704 in local stage-mask registers 714 (to account for the fact that each processing element 704 may execute instructions having different stage numbers in each iteration). A final-iteration mask register 712 may be used to indicate which of the plurality of processing elements 704 should be on or off during the final iteration of a loop.

The loop-count register 706 may be eight, sixteen, or any other number of bits in size; the value stored in the loop-count register 706 decrements (by, e.g., the loop-unroll factor) each time the loop iterates. Once the value in the loop-count register 706 reaches zero, the loop ceases iterating. The loop-unroll-factor register 708 may be two bits in size to support a maximum unroll factor of four, three bits in size to support a maximum unroll factor of eight, or any other size. The stage-mask register 710 may be of a size equal to at least the sum of the loop-unroll factor and the maximum stage count. In one embodiment, the stage-mask register 710 is 23 bits in size. The final-iteration-mask register 712 may have one bit for each of the processing elements 704.

A loop instruction may be used to initialize the state registers 706, 708, 710, 712 in the sequencer 702. The loop instruction may include parameters that indicate the total loop count, the number of processing elements to use, the stage count, and the loop-unroll factor. The loop-unroll-factor register 708 is loaded with the value of the loop-unroll factor given in the loop instruction; the values of the other registers 706, 710, 712 may be derived from the loop-instruction parameters in accordance with equations (1)-(3), as shown below.

$$\text{loop-count register } 706 = \left\lceil \frac{\left\lceil \frac{N}{VLEN} \right\rceil + SC - 1}{MVE} \right\rceil \times MVE \quad (1)$$

$$\text{stage-mask register } 710 = \quad (2)$$
$$\left( (-1) \ll \left( SC + \left( LC - \left( \left\lceil \frac{N}{VLEN} \right\rceil + SC - 1 \right) - 1 \right) \right) \right)$$

$$\text{final-iteration-mask register } 712 = (1 \ll (((N-1)\%VLEN) + 1)) - 1 \quad (3)$$

Regarding equation (1), the loop count is related to the number of iterations in the original code (N) divided by the number of processing elements 704 executing the instructions in parallel (VLEN or vector length). Additional iterations (SC−1) are needed for loop set-up and tear down. The result is rounded up to the nearest multiple of the loop-unroll factor (MVE). Regarding equation (2), binary ones are shifted into the stage-mask register 710 in accordance with the stage count (SC), taking into account any rounding up made necessary by the loop-unroll factor (MVE) as computed in the loop-count register 706 (LC). Regarding equation (3), binary ones are shifted into the final-iteration-mask register 712 equal to the number of iterations (N) modulo the number of processing elements 704 (VLEN) to mask off the unneeded processing elements 704 in the last iteration (i.e., the modulo operation gives the number of "left over" instructions in the last iteration). For example, N=13 and VLEN=8 gives FMASK=00011111, while N=16 gives FMASK=11111111. Finally, if the value of the loop-count register 706 is less than or equal to the number of bits in the stage-mask register 710 (i.e., the last few iterations of the loop may be approaching), any bits above and including the (LC−1)$^{th}$ bit in the stage-mask register 710 are cleared, and the values from the final-iteration mask register 712 are used to re-populate the (LC−1)$^{th}$ bit positions in the stage-mask register 710.

The recomputed contents of the stage-mask register 710 are then pushed out to the local copies 714 of the register in each processing element 704, wherein the (LC−1)$^{th}$ bit positions, when reached, instruct some of the processing elements 704 to switch off during the last iteration. Each processing element 704 receives and decodes instructions and inspects each instruction's stage number; the instruction is executed if its corresponding bit entry in that processing element's local mask register 714 is set. In one embodiment, the bit position of the corresponding stage number in the local mask register 714 is computed at compile or assemble time and encoded in the instruction, thereby freeing up the hardware from computing and/or storing the value.

In one example, the loop instruction specifies that the loop count is 523, the number of processing elements (VLEN) is 4, the stage count is 3, and the loop-unroll (MVE) factor is 2. In this example, the loop-count register 706 receives a value of 134, the loop-unroll-factor register 708 receives a value of 2, the stage-mask register 710 receives a value of 11 . . . 11000 (as do all the local registers 714), and the final-iteration-mask register 712 receives a value of 0111.

The state registers 706 and 710 may be updated each time the loop iterates. In one embodiment, the loop-count register 706 is decremented by the value of the loop-unroll-factor register 708, and the state-mask register 710 is shifted right a number of times equal to the value loop-unroll-factor register 708. If the loop is nearing its last few iterations (e.g., if the value of the loop-count register 706 is less than or equal to the number of bits in the stage-mask register 710), zeros are shifted in; otherwise ones are shifted in. As described above, if the loop is in its last (or last few) iterations, the values of the final-iteration-mask register 712 are copied to the local mask registers 714 (at their (LC−1)$^{th}$ bit positions).

For example, after one iteration of the loop introduced in the last example, the loop-count register 706 is updated to a value of 132, and the stage-mask register 710 is updated to a value of 11 . . . 11110 (as are all the local registers 714). In another iteration of the loop near, but not at, the end of its lifetime, the loop-count register 706 is updated to a value of 4, and the stage-mask register 710 is updated to a value of 00 . . . 00111. The local registers 714 are updated to have different values in accordance with the final-iteration-mask register 712, namely, 00 . . . 1111, 00 . . . 1111, 00 . . . 1111, and 00 . . . 0111. In a final iteration of the loop, the loop-count register 706 is updated to a value of 2, and the stage-mask register 710 is updated to a value of 00 . . . 001. The local registers 714 are again updated to have different values in accordance with the final-iteration-mask register 712, namely, 00 . . . 0011, 00 . . . 0011, 00 . . . 0011, and 00 . . . 0001.

Figure 8:
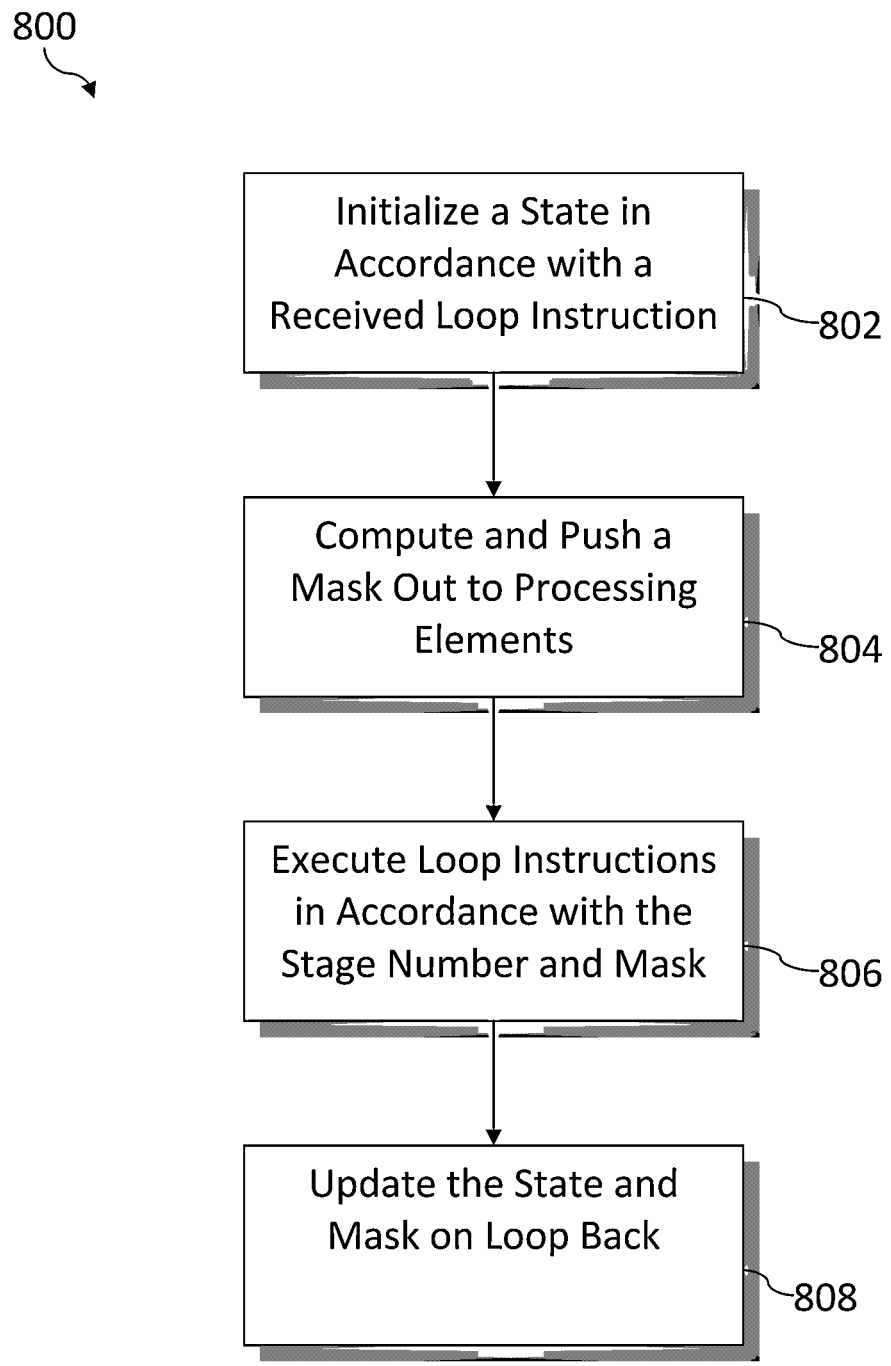
FIG. 8 is a flowchart diagram of a method for executing staged loop instructions in accordance with one embodiment of the invention.

A method 800 for executing loop instructions in accordance with embodiments of the current invention is shown in FIG. 8. In a first step 802, a loop instruction is received with information about the loop to be run (e.g., loop-unroll factor and iteration count). State registers (in, e.g., a sequencer) are initialized with this information (and/or values derived therefrom). In a second step 804, a mask is computed for one or more processing elements and sent thereto; this mask (e.g., the stage mask described above with reference to FIG. 7) contains information about which stages of instructions to execute. In a third step 806, the loop instructions are executed in accordance with their stage number and the mask. In a fourth step 808, the mask (and state information) is updated on loop back. One of skill in the art will realize that there are many ways in which the bits that control the processing elements may be organized within mask registers or otherwise, and the present invention is not limited to the described implementation of global mask registers held within the sequencer and local mask registers within each processing element. For example, it is equally possible for all required state to be held within the sequencer and instructions distributed to the processing elements in accordance with which instructions are currently enabled for each processing element.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or Java. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of executing a loop by a computer processor, the method comprising:
   loading loop kernel instructions for the loop into a memory of the computer processor, each loop kernel instruction having a stage number associated therewith;
   determining a stage threshold during each iteration of the loop;
   executing a loop prolog by executing subsets of the loop kernel instructions based on the stage threshold and stage numbers;
   executing a loop kernel by repeatedly executing the loop kernel instructions; and
   executing a loop epilog by executing a second set of subsets of the loop kernel instructions based on the stage threshold and stage numbers.

2. The method of claim 1, wherein the computer processor is a scalar processor, wherein the loop kernel instructions comprise instructions having instruction-level parallelism or multi-cycle latencies, and wherein the loop kernel instructions are software pipelined.

3. The method of claim 1, wherein the stage numbers are adjusted in accordance with each copy of an unrolled loop kernel.

4. The method of claim 1, wherein a final execution of a loop instruction runs on fewer processing or vector elements than on earlier iterations of the loop.

5. The method of claim 4, wherein the fewer processing or vector elements are selected in accordance with a mask bits controlling each processing or vector element.

6. The method of claim 1, further comprising receiving a loop setup instruction that includes information relating to the stage threshold.

7. The method of claim 6, wherein the loop setup instruction comprises a total loop count, a number of processing elements to use in executing the loop instructions, a stage count, or a loop-unroll factor.

8. The method of claim 1, wherein executing the loop epilog, loop kernel, and the loop prolog comprises comparing the instruction stage numbers to a stage threshold in the computer processor.

9. A system for executing computer-executable loop instructions, the system comprising:
   a sequencer for receiving a loop-setup instruction comprising loop information;
   a hardware register or registers for storing data related to a stage threshold, the data being derived from the loop information; and
   a processing element for executing (i) a loop prolog by executing subsets of received loop kernel instructions based on the stage threshold and stage numbers associated with the loop kernel instructions, (ii) a loop kernel by repeatedly executing the loop kernel instructions, and (iii) a loop epilog by executing a second set of subsets of the loop kernel instructions based on the stage threshold and stage numbers.

10. The system of claim 9, wherein the registers comprise stage-mask or stage-threshold registers.

11. The system of claim 9, further comprising at least one additional processing element for executing loop kernel instructions, or vector instructions to process multiple data elements in parallel.

12. The system of claim 11, wherein, during a final execution of an instruction, only a subset of the processing or vector elements execute loop kernel instructions.

13. The system of claim 12, wherein mask registers store information related to executing loop kernel instructions in the final iteration.

14. The system of claim 9, wherein the loop information comprises a total loop count, a number of processing elements to use in executing the loop instructions, a stage count, or a loop-unroll factor.

15. The system of claim 9, further comprising a loop-count register for storing a loop count.

16. The system of claim 15, wherein the loop count is derived from a total loop count divided by a number of processing elements to use in executing the loop instructions and adjusted in accordance with a stage count and rounded in accordance with a loop-unroll factor.

* * * * *